(12) United States Patent
Burtscher et al.

(10) Patent No.: US 10,040,138 B2
(45) Date of Patent: Aug. 7, 2018

(54) CUTTING INSERT FOR MACHINING

(75) Inventors: Peter Burtscher, Haeselgehr (AT); Juergen Duwe, Heiterwang (AT); Markus Krabicher, Lechaschau (AT); Uwe Schleinkofer, Reutte (AT)

(73) Assignee: Ceratizit Austria Gesellschaft m.b.H., Reutte (AT)

( * ) Notice: Subject to any disclaimer, the term of this patent is extended or adjusted under 35 U.S.C. 154(b) by 195 days.

(21) Appl. No.: 14/001,534

(22) PCT Filed: Feb. 23, 2012

(86) PCT No.: PCT/AT2012/000041
§ 371 (c)(1),
(2), (4) Date: Aug. 26, 2013

(87) PCT Pub. No.: WO2012/113006
PCT Pub. Date: Aug. 30, 2012

(65) Prior Publication Data
US 2013/0330135 A1    Dec. 12, 2013

(30) Foreign Application Priority Data

Feb. 24, 2011 (AT) .............. GM 109/2011

(51) Int. Cl.
*B23C 5/20* (2006.01)

(52) U.S. Cl.
CPC .............. *B23C 5/207* (2013.01); *B23C 5/205* (2013.01); *B23C 2200/045* (2013.01); *B23C 2200/128* (2013.01); *B23C 2200/203* (2013.01); *B23C 2210/163* (2013.01); *Y10T 407/1924* (2015.01); *Y10T 407/235* (2015.01)

(58) Field of Classification Search
CPC ........ B23C 2200/045; B23C 2200/083; B23C 2200/12; B23C 2200/121; B23C 2200/128; B23C 2200/161; B23C 2200/165; B23C 2200/168; Y10T 407/23; Y10T 407/1924
USPC ..................................... 407/42, 113
See application file for complete search history.

(56) References Cited

U.S. PATENT DOCUMENTS

| | | |
|---|---|---|
| 6,796,750 B2 | 9/2004 | Men |
| 7,677,145 B2 | 3/2010 | Grund et al. |
| 8,177,460 B2 | 5/2012 | Satran et al. |
| 8,206,066 B2 | 6/2012 | Men et al. |
| 8,371,774 B2 | 2/2013 | Zastrozynski |
| 8,573,903 B2 * | 11/2013 | Morrison .............. B23C 5/2213 407/100 |
| 2006/0245837 A1 * | 11/2006 | Dufour et al. ................ 409/132 |

(Continued)

FOREIGN PATENT DOCUMENTS

| | | |
|---|---|---|
| DE | 60211187 T2 | 2/2007 |
| DE | 102006023740 A1 | 11/2007 |
| DE | 102006025293 A1 | 12/2007 |

(Continued)

*Primary Examiner* — Alan Snyder
(74) *Attorney, Agent, or Firm* — Laurence A. Greenberg; Werner H. Stemer; Ralph E. Locher

(57) ABSTRACT

A cutting insert for machining has a substantially cylindrical main body with an axis, a lateral flank and opposing rake faces. Cutting edges are formed at the intersection of the flank and rake faces. The cutting edges have, in the direction of the axis, in each case at least two convexly curved sections which are connected together by concavely curved or substantially straight sections.

9 Claims, 4 Drawing Sheets

(56) References Cited

U.S. PATENT DOCUMENTS

2009/0290946 A1 11/2009 Zastrozynski
2011/0116878 A1 5/2011 Ebert et al.

FOREIGN PATENT DOCUMENTS

| DE | 102008037915 B3 | 8/2009 |
| EP | 2412464 A1 | 2/2012 |
| JP | 57126904 A | 8/1982 |
| JP | 1119817 A | 1/1999 |
| WO | 2008120186 A1 | 10/2008 |
| WO | 2010023659 A1 | 3/2010 |
| WO | 2010110009 A1 | 9/2010 |
| WO | WO 2010134700 A2 * | 11/2010 |

* cited by examiner

CUTTING INSERT FOR MACHINING

BACKGROUND OF THE INVENTION

Field of the Invention

The invention relates to a cutting insert for machining, having a substantially cylindrical main body, having an axis A, having a lateral flank and opposing rake faces, wherein cutting edges are formed at the intersection of said flank and rake faces, said cutting edges extending in a circular manner as seen in the direction toward the rake faces, and wherein the rake faces have an annular region immediately adjacent to the cutting edges, said annular region merging into a depression in the central region.

Cutting inserts of this kind, in which cutting edges are formed on opposite sides of the main body, are known. Compared with cutting inserts in which cutting edges are formed only on one side, they have the advantage that the cutting insert can be changed once the cutting edges on one side have become worn, and so twice as many cutting edges are available overall. However, compared with cutting inserts which are usable only on one side, they have the disadvantage that the clearance angle of the cutting edges, which is necessary for problem-free cutting, can be achieved only by very great radial and axial tilting of the cutting insert in the main tool body, whereas in the case of the cutting inserts which are usable on one side, the necessary clearance angle can be achieved at least predominantly just by shaping the main body of the cutting insert.

A serious disadvantage with the great tilting of the cutting inserts which are usable on two sides is the formation of a very large negative engagement angle, as a result of which, compared with a cutting insert which is usable on one side, comparatively hard cutting-lip engagement and considerably higher cutting forces occur.

A cutting insert having a substantially cylindrical main body having cutting edges which are configured in a circular manner in a top view toward the rake faces, said cutting insert additionally being usable on two sides, is described for example in DE 10 2008 037 915-B3.

The opposing rake faces are in this case connected together by a flank which extends, as seen in side view, exactly in a rectilinear manner parallel to the axis of the central drilled hole in the cutting insert. The rake faces have a hollow arranged around the central drilled hole, said hollow having a plurality of identical symmetrically arranged segment-like recesses or protrusions. Said segment-like protrusions or recesses serve for indexing and precisely positioning the cutting insert on the bearing surface of the main tool body. If the cutting-edge section located in the cutting position becomes worn, the cutting insert is rotated until the next, as yet unworn, cutting edge section comes into use. The rake faces have an annular region adjoining the segment-like recesses or protrusions, said annular region forming a plurality of directly adjacent concave cutting edge sections at the intersection with the flank, as seen in a side view toward the flank.

The disadvantage with this cutting insert is that, on account of the greatly tilted installation position of the cutting insert in the main tool body, a soft cutting engagement is achieved by the concave cutting edge sections only at the start of the cutting edge section, and then becomes considerably worse along the further profile of the cutting edge. Thus, the cutting forces that occur overall during the cutting operation continue to be very high in the case of such a cutting insert.

DE 10 2006 025 293-B4 likewise describes a cutting insert having a substantially cylindrical main body which is usable on two sides.

It has two opposite, substantially planar rake faces which are connected together by a flank which extends in a slightly concave manner. Exactly circular cutting edges are formed at the intersection of the flank with the rake faces, as seen in a top view toward the respective rake face. As seen in a side view toward the flanks, these cutting edges extend in a straight line, perpendicularly to the axis of the central hole which passes through the rake face of the cutting insert.

It is disadvantageous in the case of this cutting insert, too, that in the greatly tilted installation position of the cutting insert in the main tool body, caused by the profile of the cutting edge, a hard cutting engagement, associated with very high cutting forces, occurs.

BRIEF SUMMARY OF THE INVENTION

It is therefore the object of the present invention to create a cutting insert having a substantially cylindrical main body which is usable on two sides and nevertheless brings about a softer cutting engagement, associated with comparatively much lower cutting forces during the cutting operation.

According to the invention, this is achieved in that the cutting edges have, in the direction of the axis A, in each case at least two convexly curved sections which are connected together by concavely curved or substantially straight sections.

Substantially straight sections should be understood as meaning that straight sections are connected to the convexly curved sections via curved transitions on both sides.

As a result of this wave-shaped profile, according to the invention, of the cutting edges, in spite of the heavy radial and axial installation angle that is necessary for a cutting insert that is usable on two sides, a very soft cutting-lip engagement is achieved which corresponds at least to the engagement behavior in the case of a cutting insert that is usable only on one side or even exceeds this.

In an advantageous configuration of the invention, the flank has a clearance angle $\alpha$ of 0°.

Optimum stability of the cutting edges is achieved in this way.

In a further advantageous configuration, the annular region directly adjoining the cutting edges has a rake angle $\beta$ in the range of 20° to 30°.

As a result, the effective rake angle in the installation position assumes a value which is favorable for the application range of the tool, and optimizes chip formation and the cutting forces.

It is particularly advantageous if the annular region merges via a step into a planar depression in the central region, perpendicular to the axis A.

In this way, the cutting insert bears optimally against the bearing surface of the main tool body.

As a result of the planar depression in the central region, there are no elevations on the rake face which could hinder the chip flow.

In a further advantageous configuration of the invention, the flank has in its center at least two spherical-cap-shaped recesses for indexing the cutting insert.

As a result of the central arrangement, indexing of the cutting insert is easily achieved simultaneously for both sides of the cutting insert. The spherical-cap shape, which preferably interacts with a correspondingly adapted spherical section surface of the main tool body, allows smooth indexing of the cutting insert.

In this case, it is advantageous if the number of spherical-cap-shaped recesses corresponds to the number of convexly curved sections on one side of the cutting insert, and if the convexly curved sections and the spherical-cap-shaped recesses are arranged in such a manner with respect to one another that when the cutting insert is turned in the tool the cutting edges located in the cutting position are positioned in the same way. This means that the profile of the cutting edges of the two opposite rake faces is rotated through 180° with respect to one another about an axis transverse to the axis A.

It is also advantageous if four convexly curved recesses are formed on each rake face of the cutting insert.

In this case, an optimum compromise is achieved between a number of usable different cutting edge sections which is as large as possible and a simultaneously sufficient length of the cutting edge section that is available in each case for machining.

In order to fasten the cutting insert, it may be advantageous if a central bore passes through the depression in the central region.

Then, the cutting insert can easily be fastened to the main tool body by way of a clamping screw.

A milling tool in which the cutting inserts according to the invention are used advantageously has a main body having indexing elements configured in an at least regionally spherical manner.

BRIEF DESCRIPTION OF THE SEVERAL VIEWS OF THE DRAWING

The invention is explained in more detail in the following text with reference to the figures.

DESCRIPTION OF THE INVENTION

The cutting insert according to the invention has a substantially cylindrical main body having an axis A. The lateral face of the cylinder forms the flank -1- of the cutting insert. The end faces of the cylinder form the rake faces -2-, -2'-. The cutting edges -3-, -3'- are formed at the intersection of the flank -1- and the rake faces -2-, -2'-. The cutting edges -3-, -3'- extend in an exactly circular manner as seen in the direction toward the rake faces -2-, -2'-, while, as seen in the direction of the axis A, toward the flank -1-, they have four convexly curved sections -4-, -4'-, distributed regularly around the circumference, which are each connected together by concave sections -5-, -5'-.

The flank -1- has an exact clearance angle of 0°.

The rake faces -2-, -2'- have, immediately adjacent to the cutting edges -3-, -3'-, an annular region -7-, -7'- having a rake angle β of 25°. This annular region -7-, -7'- merges via a step -9-, -9'- into a planar depression -10-, -10'- in the central region of the cutting insert.

In the central region of the flank -1-, four spherical-cap-like recesses -6- are introduced, which serve for indexing the cutting insert in the main tool body -12-. The four convex sections of the opposing cutting edges -3-, -3'- are in this case arranged such that, even when the cutting insert is turned in the tool, in case the same positioning of the cutting edges -3- and -3'- is ensured. This is achieved in that the cutting edge profile of the two opposing rake faces -2-, -2'- is rotated through 180° with respect to one another about an axis transverse to the axis A.

Figure 1:
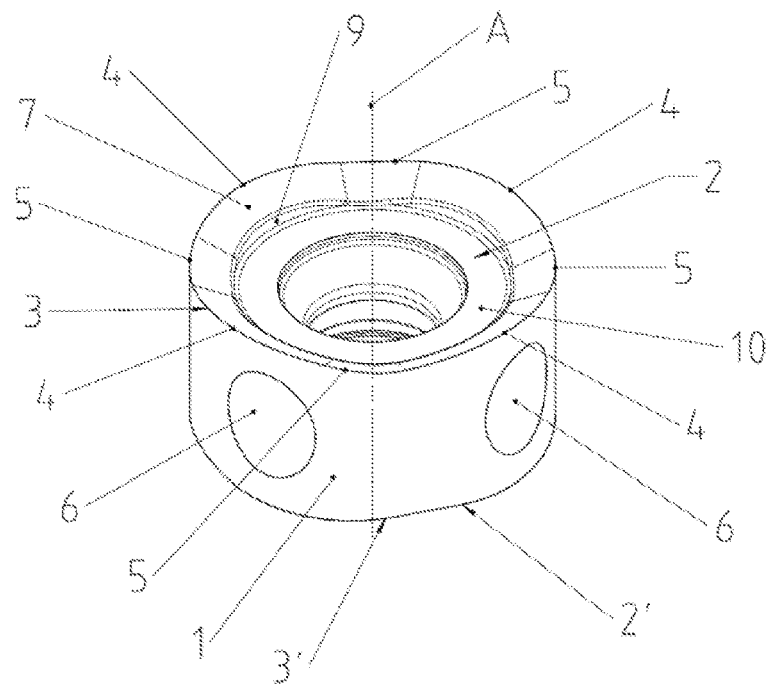
FIG. 1 shows an oblique view from above of a cutting insert according to the invention
Figure 2:
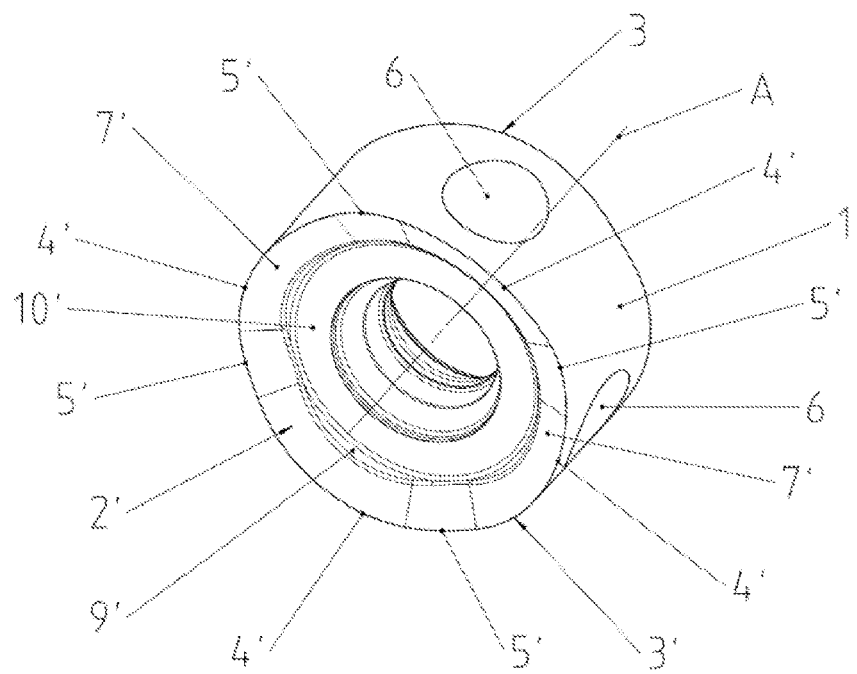
FIG. 2 shows an oblique view from below of the cutting insert according to FIG. 1
Figure 3:
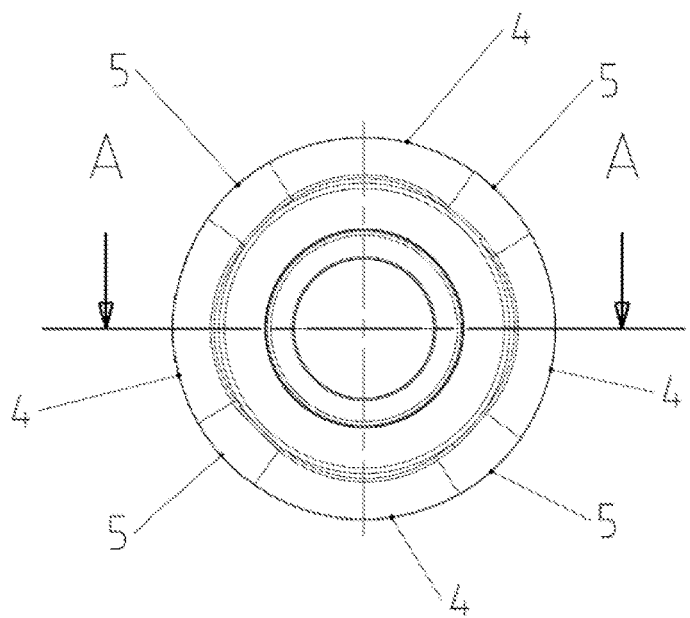
FIG. 3 shows a top view of the cutting insert according to FIG. 1
Figure 4:
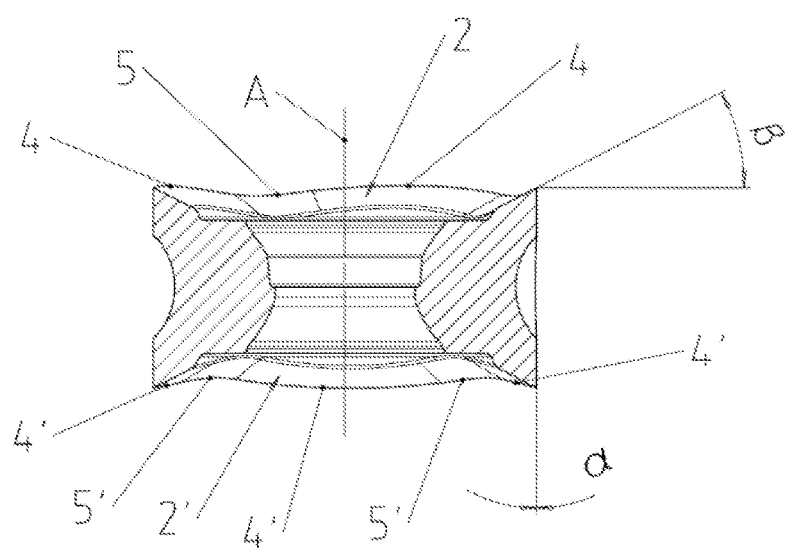
FIG. 4 shows a side view of the cutting insert according to the invention in section A-A
Figure 5:
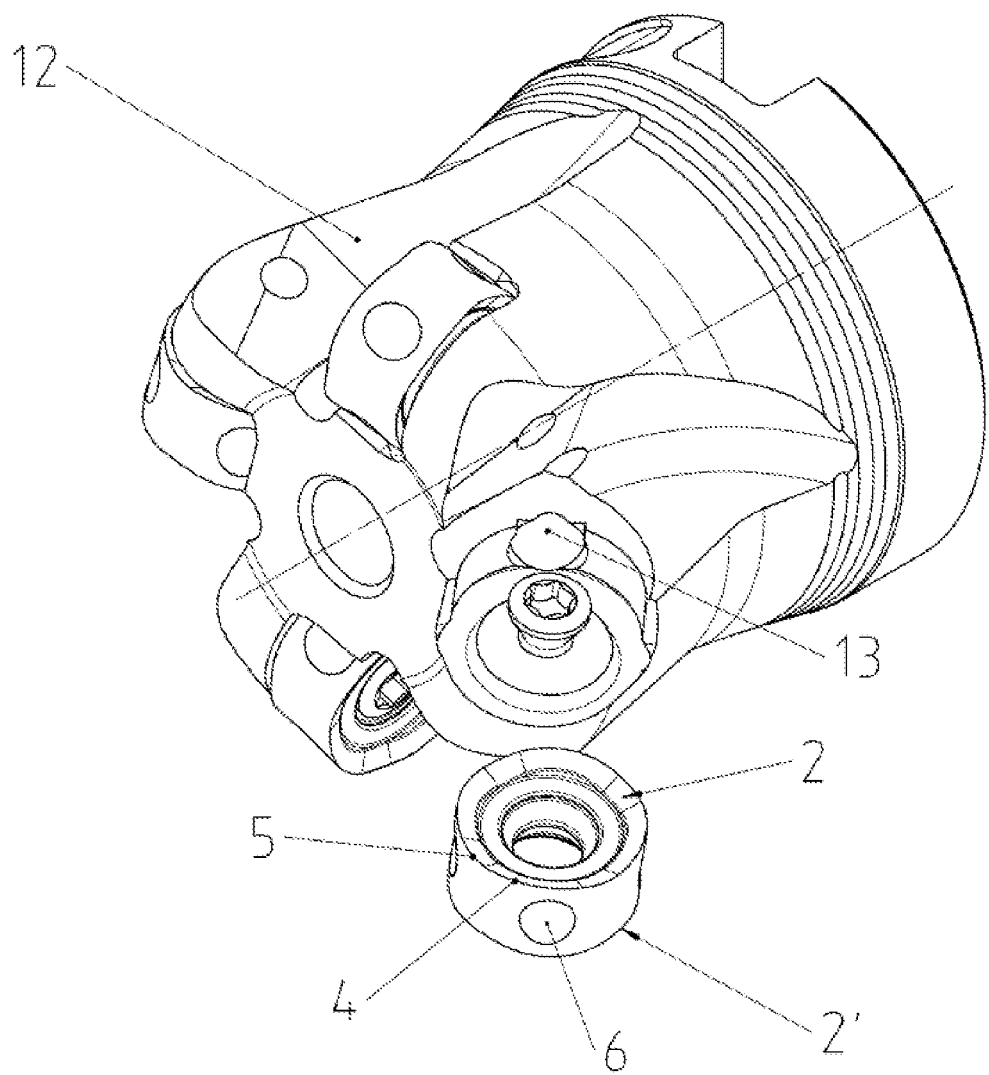
FIG. 5 shows an oblique view of a milling tool having four cutting inserts according to the invention according to FIG. 1
Figure 6:
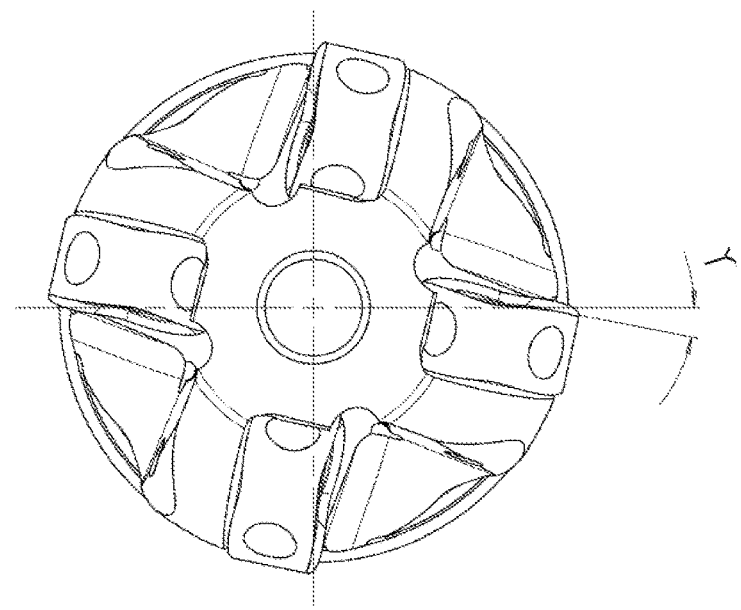
FIG. 6 shows a front view of the milling tool according to FIG. 5
Figure 7:
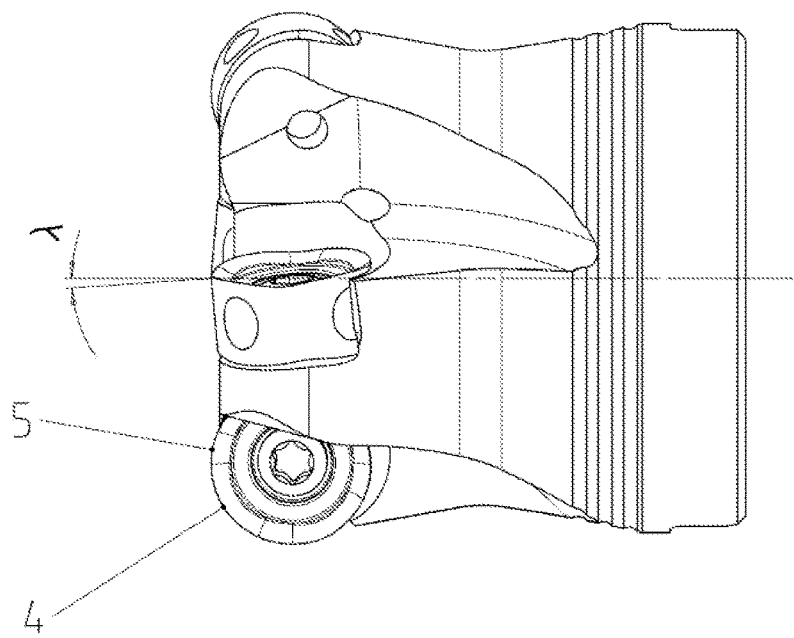
FIG. 7 shows a side view of the milling tool according to FIG. 5

FIGS. 5, 6 and 7 illustrate a milling tool having four cutting inserts according to the invention.

FIG. 5 illustrates a cutting insert removed from the insert seat, such that the indexing element -13- of the main body -12- having an at least regionally spherical surface can be seen. The indexing element -13- engages, when the cutting insert is fixed by way of the clamping screw, in the corresponding spherical-cap-like recess in the cutting insert and positions the latter on the insert seat of the main tool body. If the cutting edge sections -4- and -5- located currently in the cutting position become worn, the cutting insert is rotated through a ¼ revolution after loosening the clamping screw, until the next unworn cutting edge sections -4- and -5- are located in the cutting position. If all four cutting edge sections -4- and -5- on the side of the rake face -2- become worn, the cutting insert can be turned and the four cutting edge sections -4'- and -5'- on the opposite rake face -2'- can be brought into use in succession.

FIG. 6 shows the radial setting angle γ of −11° and FIG. 7 shows the axial setting angle λ of −4°, at which each cutting insert is arranged inclined in the main tool body in order to ensure the clearance angle of the cutting inserts that is necessary for an optimum cutting operation.

FIG. 7 shows that the cutting inserts are arranged in such a way in the main tool body -12- that the convexly curved section -4- of the cutting edge -3- is arranged in the radially external region of the milling tool, while the concavely curved section -5- of the cutting edge -3- is arranged in the radially internal region of the milling tool.

The invention claimed is:

1. A milling tool, comprising:
   at least one cutting insert containing a cylindrical main body having an axis, a lateral flank, opposing rake faces, and a central region with a depression formed therein, wherein at an intersection of said lateral flank and said rake faces cutting edges being formed, said cutting edges extending circularly as seen in a direction toward said rake faces, said rake faces have an annular region immediately adjacent to said cutting edges, said annular region merging into said depression in said central region, said cutting edges having, in a direction of said axis, in each case at least two convexly curved sections connected together by sections selected from the group consisting of concavely curved sections and substantially straight sections, said cutting insert having four-fold rotational indexibility around said axis of said cutting insert; and
   a main tool body configured for receiving said at least one cutting insert in such a manner that a convexly curved section of an active cutting edge being in a cutting position disposed in a radially outer region of the milling tool, while a concavely curved or substantially straight section of said active cutting edge being in the cutting position disposed in a radially inner region of the milling tool.

2. The milling tool according to claim 1, wherein said lateral flank of said cutting insert has a clearance angle α of 0°.

3. The milling tool according to claim 1, wherein said annular region of said cutting insert has a rake angle β in a range of 20°- 30°.

4. The milling tool according to claim 1, wherein said annular region of said cutting insert merges via a step into said depression being a planar depression, perpendicular to said axis.

5. The milling tool according to claim 1, wherein said lateral flank of said cutting insert has a center with at least two spherical-cap-shaped recesses formed therein for indexing said cutting insert in said main tool body.

6. The milling tool according to claim 5, wherein said main tool body has at least one indexing element configured in a regionally spherical manner.

7. The milling tool according to claim 5, wherein:

a number of said spherical-cap-shaped recesses corresponds to a number of said convexly curved sections on one side of said cutting insert; and said convexly curved sections and said spherical-cap-shaped recesses are disposed in such a manner with respect to one another that when said cutting insert is turned in said main tool body said cutting edges disposed in the cutting position are positioned in a same way.

8. The milling tool according to claim 5, wherein said two convexly curved sections are two of four convexly curved cutting edge sections and said at least two spherical-cap-shaped recesses are two of four spherical-cap-shaped recesses formed in said lateral flank.

9. The milling tool according to claim 1, wherein said cylindrical main body has a central bore formed therein and passing through said central region of said depression.

* * * * *